United States Patent
Chipp

(10) Patent No.: US 10,946,926 B2
(45) Date of Patent: Mar. 16, 2021

(54) MULTIPIECE HANDLEBAR ASSEMBLY

(71) Applicant: Fat Baggers, Inc., Chariton, IA (US)

(72) Inventor: Gary D. Chipp, Chariton, IA (US)

(73) Assignee: FAT BAGGERS, INC., Chariton, IA (US)

( * ) Notice: Subject to any disclaimer, the term of this patent is extended or adjusted under 35 U.S.C. 154(b) by 0 days.

(21) Appl. No.: 16/549,468

(22) Filed: Aug. 23, 2019

(65) Prior Publication Data
US 2020/0062331 A1 Feb. 27, 2020

Related U.S. Application Data

(60) Provisional application No. 62/722,693, filed on Aug. 24, 2018.

(51) Int. Cl.
| | | |
|---|---|---|
| *B62K 21/24* | (2006.01) | |
| *B62K 11/14* | (2006.01) | |
| *B62K 21/12* | (2006.01) | |

(52) U.S. Cl.
CPC .............. *B62K 21/24* (2013.01); *B62K 11/14* (2013.01); *B62K 21/12* (2013.01)

(58) Field of Classification Search
CPC ......... B62K 21/24; B62K 11/14; B62K 21/12
See application file for complete search history.

(56) References Cited

U.S. PATENT DOCUMENTS

| | | | | |
|---|---|---|---|---|
| 602,600 A | * | 4/1898 | Green .................... | B62K 21/16 74/551.4 |
| 4,682,509 A | * | 7/1987 | Takamiya .............. | B62K 21/16 403/97 |
| 5,199,322 A | * | 4/1993 | Wu ........................ | B62K 21/12 403/292 |
| 5,598,744 A | * | 2/1997 | Chen ...................... | B62K 21/12 403/362 |
| 6,234,042 B1 | * | 5/2001 | An ......................... | B62K 21/16 74/551.3 |
| 6,301,749 B1 | * | 10/2001 | Chen ...................... | B62K 3/002 16/427 |
| 8,297,148 B1 | * | 10/2012 | Ferguson .............. | B62K 21/125 74/551.4 |
| 2006/0145446 A1 | * | 7/2006 | Schmider ............... | B62K 21/12 280/281.1 |

FOREIGN PATENT DOCUMENTS

| | | | | |
|---|---|---|---|---|
| DE | 9203615 U1 | * | 5/1992 | ............. B62K 21/12 |
| GB | 2376927 A | * | 12/2002 | ............. B62K 21/12 |
| WO | WO-2017029310 A1 | * | 2/2017 | ............. B62K 21/12 |

* cited by examiner

*Primary Examiner* — Vicky A Johnson
(74) *Attorney, Agent, or Firm* — Goodhue, Coleman & Owens, P.C.

(57) ABSTRACT

A multipiece handlebar assembly, method of assembly and kit are disclosed. The multipiece handlebar assembly, method and kit includes a first handlebar section having a first grip end spaced apart from a first handlebar mounting end and a second handlebar section having a second grip end spaced apart from a second handlebar mounting end. An interjoining feature is at the first and second handlebar mounting ends, wherein the interjoining feature on the first handlebar mounting end is removably secured to the interjoining feature on the second handlebar mounting end. At least one removably secured attachment feature is secured through the interjoining feature.

16 Claims, 3 Drawing Sheets

MULTIPIECE HANDLEBAR ASSEMBLY

PRIORITY STATEMENT

This application claims priority to U.S. Provisional Patent Application No. 62/722,693, filed on Aug. 24, 2018, titled MULTIPIECE HANDLEBAR ASSEMBLY hereby incorporated by reference in its entirety.

FIELD OF THE INVENTION

The present disclosure relates generally to handlebars for a motorcycle. More particularly, but not exclusively, the present disclosure relates to a multipiece handlebar assembly, method of assembly and kit for a motorcycle.

BACKGROUND

Handlebars for motorcycles are manufactured as a single, unitary piece. The overall dimensions of the handlebar poses challenges with manufacturing, polishing, chroming, finishing, shipping, storage, installation, and replacement.

SUMMARY

Therefore, it is a primary object, feature, or advantage of the present disclosure to improve over the state of the art.

It is a further object, feature, or advantage is to provide a multipiece handlebar assembly.

It is a still further object, feature, or advantage is to provide a solution that addresses the overall dimensions of the handlebar thereby resolving issues with manufacturing, polishing, chroming, finishing, shipping, storage, installation, and replacement.

Another object, feature, or advantage is to enable quick replacement of existing handlebars with a multipiece handlebar assembly of the present disclosure.

Yet another object, feature, or advantage is to provide a multipiece handlebar assembly that is rigidly secured to the yoke or crown of the forks to prevent unwanted movement or creep after installation.

It is a still further object, feature, or advantage is to provide a multipiece handlebar kit for replacing existing single-piece handlebars.

Another object, feature, or advantage is to provide a handlebar assembly that allows for quick assembly and wiring.

An aspect of the present disclosure includes a multipiece handlebar assembly. The multipiece handlebar assembly includes a first handlebar section having a first grip end spaced apart from a first handlebar mounting end and a second handlebar section having a second grip end spaced apart from a second handlebar mounting end. An interjoining feature is at the first and second handlebar mounting ends, wherein the interjoining feature on the first handlebar mounting end is removably secured to the interjoining feature on the second handlebar mounting end. At least one removably secured attachment feature is secured through the interjoining feature.

According to at least one aspect, a method for assembling a multipiece handlebar assembly. The method includes providing a first handlebar section having a first grip end spaced apart from a first handlebar mounting end, a second handlebar section having a second grip end spaced apart from a second handlebar mounting end, and an interjoining feature at the first and second handlebar mounting ends. An interjoining feature is removably interlocked at the first and second handlebar mounting ends and at least one attachment feature is removably secured through the interjoining feature for assembling the first handlebar section to the second handlebar section.

According to another aspect, a multipiece handlebar kit is disclosed. The kit includes a first handlebar section having a first grip end spaced apart from a first handlebar mounting end, wherein the first handlebar mounting end includes a first interjoining feature with a first interjoining attachment feature. The kit also includes a second handlebar section having a second grip end spaced apart from a second handlebar mounting end, wherein the second handlebar mounting end includes a second interjoining feature with a second interjoining attachment feature. At least one removably securable interjoining attachment feature in the kit for rigidly securing the first and second interjoining feature together for assembling the multipiece handlebar kit.

One or more of these and/or other objects, features, or advantages of the present disclosure will become apparent from the specification and claims that follow. No single embodiment need provide each and every object, feature, or advantage. Different embodiments may have different objects, features, or advantages. Therefore, the present disclosure is not to be limited to or by an objects, features, or advantages stated herein.

DETAILED DESCRIPTION

Figure 1:
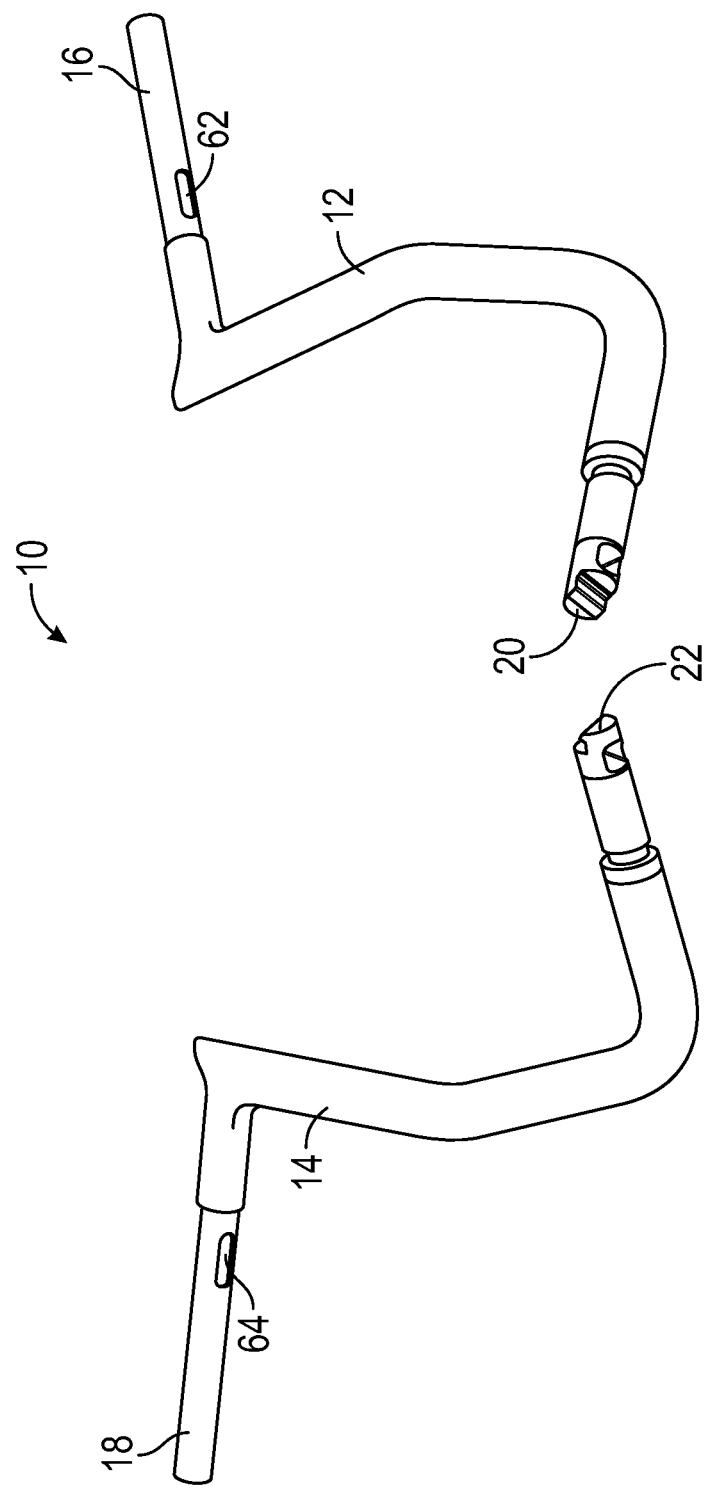
FIG. 1 is a perspective view a multipiece handlebar assembly in accordance with an exemplary aspect of the present disclosure.
Figure 2:
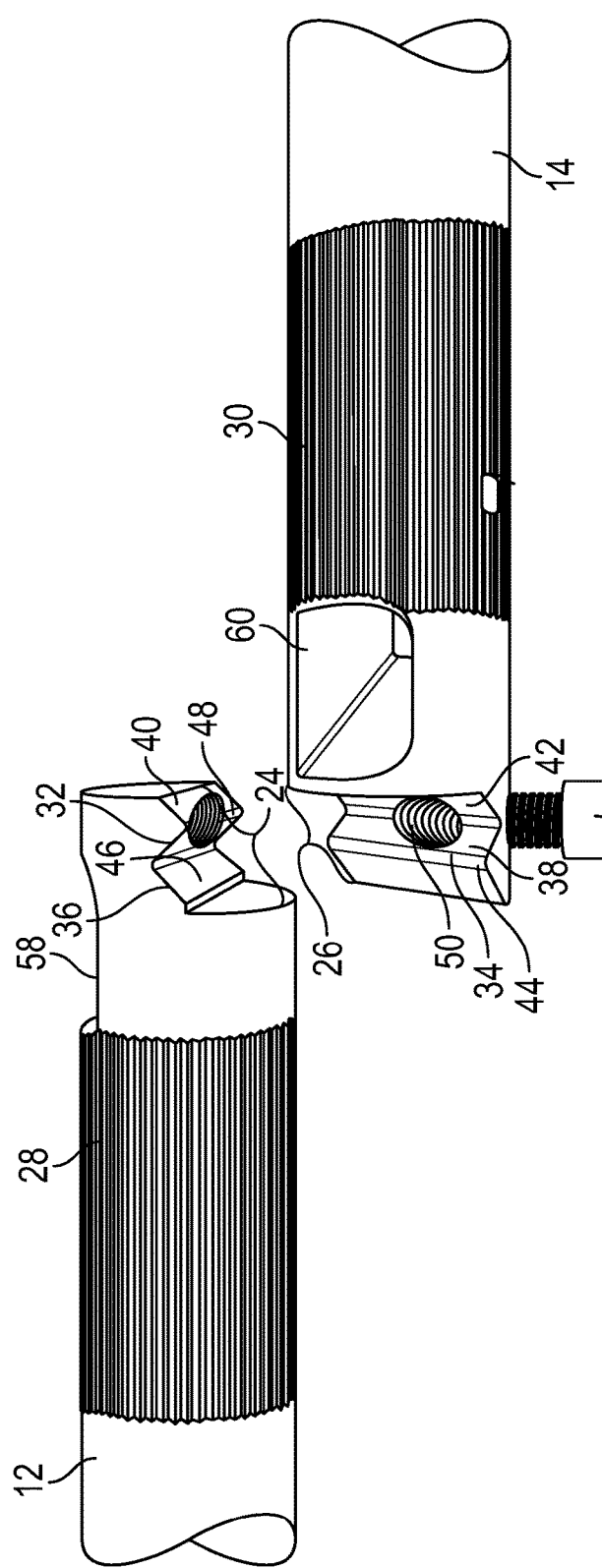
FIG. 2 is a perspective view of the interjoining ends of the multipiece handlebar assembly illustrated in a separated position.
Figure 3:
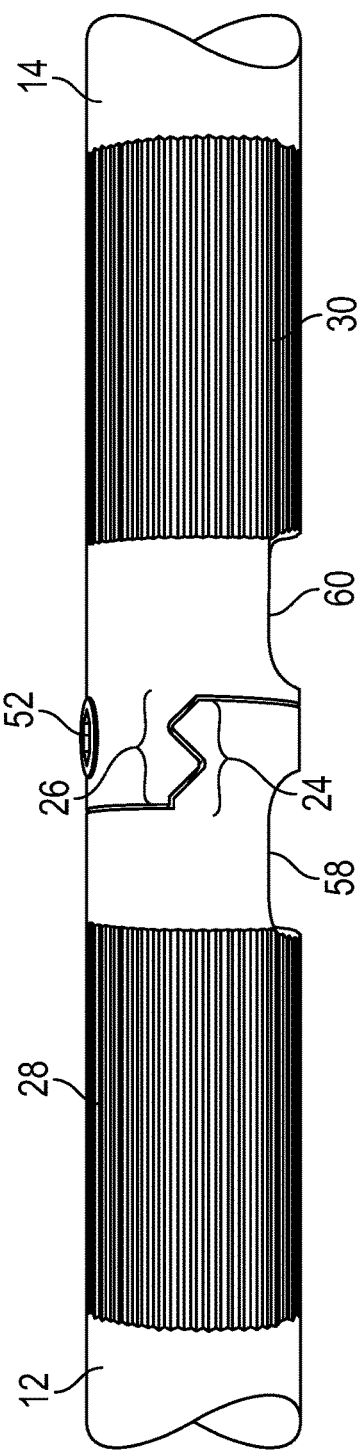
FIG. 3 is a perspective view of the interjoining ends of the multipiece handlebar assembly connected together.

A multipiece handlebar assembly 10 in accordance with exemplary aspects of the present disclosure is shown in FIGS. 1-3. The multipiece handlebar assembly 10 can include two or more assembled pieces. In one aspect, the multipiece handlebar assembly 10 includes a separate handlebar section 12 and handlebar section 14. Each handlebar section 12, 14 includes respective grip ends 16, 18 spaced apart from respective adjoining ends 20, 22 configured with respective interjoining features 24, 26 and respective mounting features 28, 30. Each handlebar section 12, 14 has the same dimensions and can be manufactured to a desired (assembled) diameter, width, pullback and rise. Single-piece handlebar sections 12, 14 can be 38" wide, 16" tall and 8" making manufacturing, polishing, chroming, finishing, shipping, storage, installation, and replacement difficult and expensive. For the same size handlebars, each handlebar section 12, 14 of the present disclosure would be half the dimensions of a single-piece handlebar thereby significantly reducing the difficulty and expense in manufacturing, polishing, chroming, finishing, shipping, storing, installing, and replacing.

The interjoining features 24, 26 of each handlebar section includes one or more teeth 32, 34, having respective sawtooth profiles 36, 38, that mate together. For example, in one aspect, a male portion 40 of the sawtooth profile 36 on interjoining features 24 of handlebar section 12 is received into a female portion 42 of the sawtooth profile 38 on interjoining features 26 of handlebar section 14. Similarly, in the same aspect, a male portion 44 of the sawtooth profile 38 on interjoining features 26 of handlebar section 14 is received into a female portion 46 of the sawtooth profile 36 on interjoining features 24 of handlebar section 12. Although a sawtooth profile 36, 38 is illustrated, the present disclosure contemplates other interjoining profiles.

The interjoining features 24, 26 of each handlebar section 12, 14, in addition to the interjoining teeth 32, 34, can include additional interjoining features such as pins, screws, rivets, clamps, collars, rings, bolts, etc. for firmly securing the two handlebar sections 12, 14 together. In one aspect, a threaded bolt hole 48 passes into/through male portion 40 of sawtooth profile 36 on interjoining features 24 of handlebar section 12 and a bolt hole 50 passes through female portion 42 of sawtooth profile 38 on interjoining features 26 of handlebar section 14.

Figure 4:
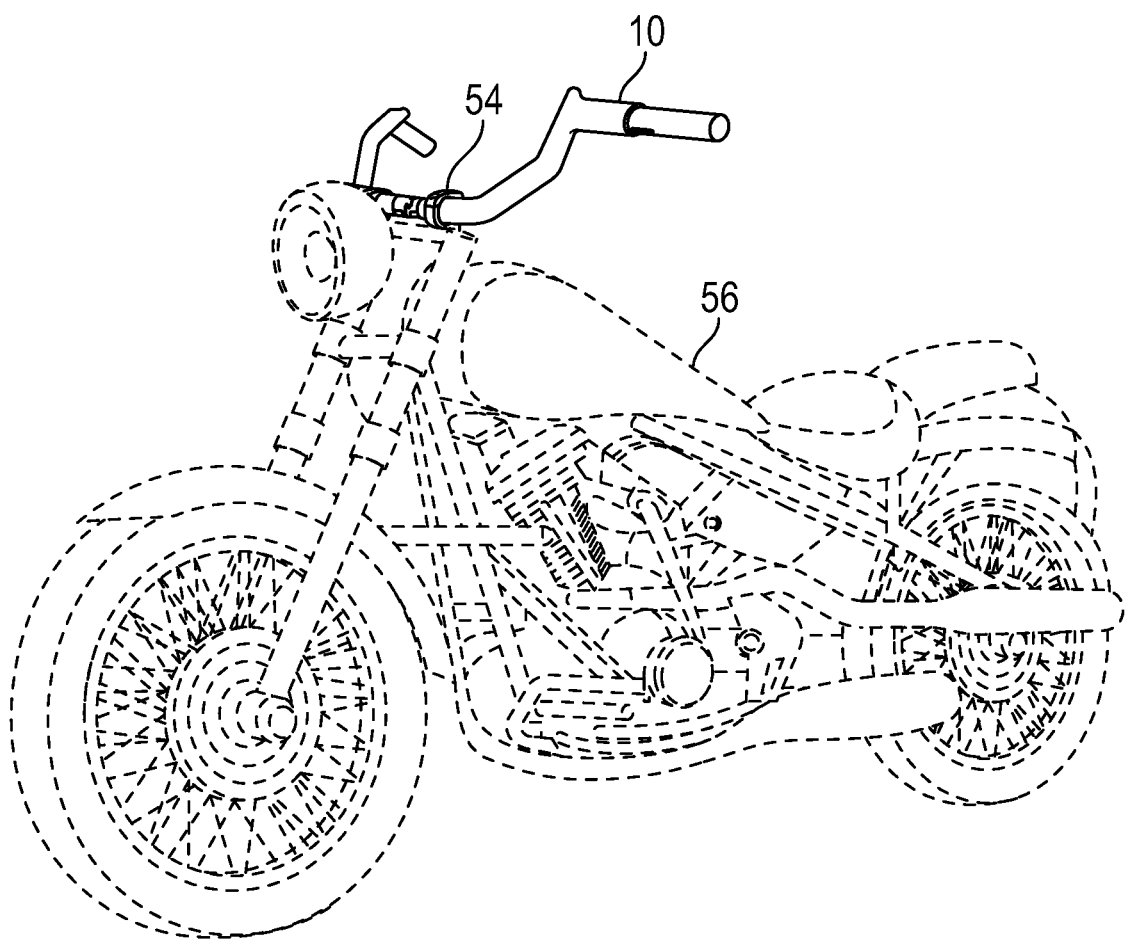
FIG. 4 is a perspective view of the multipiece handlebar assembly removably attached to mounting hardware of a motorcycle.

When assembled, as best shown in FIG. 3, a bolt 52 rigidly secures the interjoining features 24, 26 together of each handlebar section 12, 14 thereby creating a rigid single-piece handlebar assembly that can be taken apart into a multipiece handlebar assembly 10, as best shown in FIG. 4. In another aspect, a threaded bolt hole can pass into/through male portion 40 of sawtooth profile 36 on interjoining feature 26 of handlebar section 14 and a bolt hole passes through female portion 42 of sawtooth profile 38 on interjoining feature 26 of handlebar section 12. When assembled, as shown in FIG. 3, the bolt 52 rigidly secures the interjoining features 24, 26 together thereby creating a rigid single-piece handlebar assembly that can be taken apart into the multipiece handlebar assembly 10 (see FIG. 1).

According to a preferred aspect of the present disclosure, interjoining ends of each handlebar section are removably joined together whereby a multipiece handlebar assembly when assembled forms a rigid single-piece handlebar assembly (see FIG. 3) and when unassembled is a multipiece handlebar assembly that includes two or more distinct and separate handlebar sections 12, 14, where each handlebar section includes at least respective grip ends 16, 18 spaced apart from respective adjoining ends 20, 22 configured with respective interjoining features 24, 26 and respective mounting features 28, 30 (see FIG. 1).

The interjoining features 24, 26 of each handlebar section 12, 14 includes respective mounting features 24, 26, such as knurling, for interlocking with and rigidly securing multipiece handlebar assembly 10 to handlebar mounting hardware 54, such as a handlebar yoke or risers of a motorcycle 56 (see FIG. 4). Although knurling is illustrated pictorially, the present disclosure contemplates other surface irregularities, undulations or geometries to prevent movement or creep of the multipiece handlebar assembly 10 relative to handlebar mounting hardware 54.

The interjoining features 24, 26 of each handlebar section 12, 14 can be shorter or longer in length for different model fitments. For example, the interjoining features 24, 26 of each handlebar section 12, 14 can be shorter than those illustrated in FIGS. 2-3 to accommodate fitment designs for various motorcycles 56 and mounting hardware 54.

The interjoining features 24, 26 of each handlebar section 12, 14 also include one or more wiring features whereby wiring for controls can be received. For example, the interjoining features 24, 26 of each handlebar section 12, 14 can include respective wiring ports 58, 60 (see FIGS. 2-3) disposed between the interjoining features 24, 26 and mounting features 28, 30 and respective wiring ports 62, 64 (see FIG. 1) for wiring and cables (not shown) to be fed into and through each handlebar section 12, 14.

The multipiece handlebar assembly 10 of the present disclosure includes at least two separate handlebar sections 12, 14, such as a first handlebar section and a second handlebar section. Each handlebar section 12, 14 includes at least respective grip ends 16, 18 spaced apart from respective adjoining ends 20, 22 configured with respective interjoining features 24, 26 and respective mounting features 28, 30 (see FIG. 1). The difficulty and expense of manufacturing, polishing, chroming, finishing, shipping, storing, installing, and replacing the multipiece handlebar assembly is significantly reduced from that of standard, single-piece handlebars given that each handlebar section 12, 14 of the multipiece handlebar assembly 10 is half the size or half the dimensional footprint of standard, single-piece handlebars.

All descriptions, features and details are intended to read on the multipiece handlebar assembly disclosed, whether stated in a single instance or in preceding or proceeding paragraphs.

The present disclosure is not to be limited to the particular aspects described herein. In particular, the present disclosure contemplates numerous variations in the type of ways in which aspects of the disclosure can be applied to a multipiece handlebar assembly. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of aspects, processes or methods of the disclosure. It is understood that any other modifications, substitutions, and/or additions can be made, which are within the intended spirit and scope of the disclosure. For the foregoing, it can be seen that the disclosure accomplishes at least all of the intended objectives.

The previous detailed description is of a small number of aspects for implementing the disclosure and is not intended to be limiting in scope. The following claims set forth a number of the aspects of the disclosure disclosed with greater particularity.

What is claimed is:

1. A multipiece handlebar assembly, comprising:
 a first handlebar section having a first grip end spaced apart from a first handlebar mounting end of the first handlebar section;
 a second handlebar section having a second grip end spaced apart from a second handlebar mounting end of the second handlebar section;
 a first interjoining feature at the first handlebar mounting end;
 a second interjoining feature at the second handlebar mounting end, wherein the first interjoining feature is removably secured to the second interjoining feature; and
 at least one removably secured attachment feature secured through the first interjoining feature and the second interjoining feature, wherein the first handlebar section and the second handlebar section are connected together when the removably secured attachment feature is secured through the first interjoining feature and the second interjoining feature, and wherein the first handlebar section and the second handlebar section are disconnected when the at least one removably secured attachment feature is removed;
 a first wiring port disposed between the first interjoining feature and the first grip end; and a second wiring port disposed between the second interjoining feature and the second grip end.

2. The multipiece handlebar assembly of claim 1, further comprising:
a first set of knurling disposed proximate the first interjoining feature for attaching to handlebar mounting hardware; and
a second set of knurling disposed proximate the second interjoining feature for attaching to handlebar mounting hardware.

3. The multipiece handlebar assembly of claim 1, wherein the at least one removably secured attachment feature comprises a bolt threaded into the first interjoining feature and the second interjoining feature.

4. The multipiece handlebar assembly of claim 1, wherein the first interjoining feature comprises an undulated profile for rigidly securing the first interjoining feature on the first handlebar mounting end to the second interjoining feature on the second handlebar mounting end and wherein the second interjoining feature comprises an undulated profile for rigidly securing the second interjoining feature on the second handlebar mounting end to the first interjoining feature on the first handlebar mounting end.

5. The multipiece handlebar assembly of claim 1, wherein the at least one removably secured attachment feature has a first portion secured in the first interjoining feature on the first handlebar mounting end and a second portion secured through the second interjoining feature on the second handlebar mounting end.

6. A method for assembling a multipiece handlebar assembly, comprising:
providing a first handlebar section having a first grip end spaced apart from a first handlebar mounting end of the first handlebar section, a first interjoining feature at the first handlebar mounting end, a second handlebar section having a second grip end spaced apart from a second handlebar mounting end of the second handlebar section, a second interjoining feature at the second handlebar mounting end, wherein the first interjoining feature is removably secured to the second interjoining feature;
removably interlocking the first interjoining feature and the second interjoining feature;
inserting wiring into the first handlebar section through at least one wiring port disposed at the first interjoining feature;
inserting wiring into the second handlebar section through at least one wiring port disposed at the second interjoining feature; and
removably securing at least one attachment feature through the first interjoining feature and the second interjoining feature for assembling the first handlebar section to the second handlebar section.

7. The method of claim 6, further comprising:
securing knurling disposed proximate the interjoining feature to handlebar mounting hardware for mounting the multipiece handlebar assembly.

8. The method of claim 6 further comprising:
separating the first handlebar section and the second handlebar section by removing the at least one attachment feature.

9. The method of claim 6, further comprising:
securing one or more undulations at the first interjoining feature and the second interjoining feature together for rigidly securing the first interjoining feature on the first handlebar mounting end to the second interjoining feature on the second handlebar mounting end.

10. The method of claim 6, further comprising:
removably attaching the assembled first handlebar section and the second handlebar section to handlebar mounting hardware on a motorcycle.

11. The method of claim 10, further comprising:
removing an existing single-piece handlebar from the handlebar mounting hardware before removably attaching the assembled first handlebar section and the second handlebar section to handlebar mounting hardware on the motorcycle.

12. The method of claim 6 further comprising:
manufacturing the first and second handlebar sections separately.

13. A multipiece handlebar kit, comprising:
a first handlebar section having a first grip end spaced apart from a first handlebar mounting end, wherein the first handlebar mounting end includes a first interjoining feature with a first interjoining attachment feature and at least one first wiring port disposed at the first interjoining feature;
a second handlebar section having a second grip end spaced apart from a second handlebar mounting end, wherein the second handlebar mounting end includes a second interjoining feature with a second interjoining attachment feature and at least one second wiring port disposed at the second interjoining feature; and
at least one removably securable interjoining attachment feature for rigidly securing the first and second interjoining feature together for assembling the multipiece handlebar kit;
wherein the multipiece handlebar kit is disconnected when the removably securable interjoining attachment feature is removed.

14. The multipiece handlebar kit of claim 13, wherein the at least one removably securable attachment feature comprises a bolt threaded into the first interjoining feature and the second interjoining feature attaching the first handlebar section to the second handlebar section.

15. The multipiece handlebar kit of claim 13, further comprising:
a first knurling disposed proximate the first interjoining feature for attaching to handlebar mounting hardware; and
a second knurling disposed proximate the second interjoining feature for attaching to handlebar mounting hardware.

16. The multipiece handlebar kit of claim 13, wherein wiring is inserted into the first handlebar section through the at least one first wiring port disposed at the first interjoining feature and into the second handlebar section through the at least one second wiring port disposed at the second interjoining feature.

\* \* \* \* \*